(12) United States Patent  (10) Patent No.: US 8,964,259 B2
Takabatake  (45) Date of Patent: Feb. 24, 2015

(54) IMAGE PROCESSING APPARATUS, IMAGE READING APPARATUS, IMAGE PROCESSING METHOD, AND IMAGE PROCESSING PROGRAM

(71) Applicant: PFU Limited, Kahoku-shi, Ishikawa (JP)

(72) Inventor: Masanari Takabatake, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 13/829,440

(22) Filed: Mar. 14, 2013

(65) Prior Publication Data

US 2013/0321858 A1    Dec. 5, 2013

(30) Foreign Application Priority Data

Jun. 1, 2012 (JP) ................................. 2012-126273

(51) Int. Cl.
*H04N 1/00* (2006.01)
*H04N 1/38* (2006.01)
*G06F 3/0488* (2013.01)
*G06F 3/00* (2006.01)
*G06F 3/042* (2006.01)
*H04N 1/195* (2006.01)

(52) U.S. Cl.
CPC ....... *H04N 1/00408* (2013.01); *H04N 1/00381* (2013.01); *H04N 1/38* (2013.01); *G06F 3/0488* (2013.01); *G06F 3/005* (2013.01); *G06F 3/042* (2013.01); *H04N 1/19594* (2013.01); *H04N 2201/0081* (2013.01); *H04N 2201/0436* (2013.01)

USPC .......................................... 358/474; 345/156

(58) Field of Classification Search
USPC ................... 358/474, 497; 399/365, 377, 379
See application file for complete search history.

(56) References Cited

U.S. PATENT DOCUMENTS

| 5,511,148 A | 4/1996 | Wellner |
| 5,818,612 A | 10/1998 | Segawa et al. |
| 6,516,151 B2 | 2/2003 | Pilu |
| 2005/0231767 A1* | 10/2005 | Brake et al. .................... 358/474 |
| 2009/0002344 A1 | 1/2009 | Wilson et al. |
| 2011/0169776 A1 | 7/2011 | Ouchi |

FOREIGN PATENT DOCUMENTS

| JP | 5-150364 A | 6/1993 |
| JP | 8-204914 A | 8/1996 |
| JP | 10-327312 A | 12/1998 |
| JP | 2005-184361 A | 7/2005 |
| JP | 2006-304127 A | 11/2006 |
| JP | 2007-013425 A | 1/2007 |
| WO | WO-2011/152166 A1 | 12/2011 |

* cited by examiner

*Primary Examiner* — Marivelisse Santiago Cordero
*Assistant Examiner* — Kent Yip
(74) *Attorney, Agent, or Firm* — McDermott Will & Emery LLP

(57) ABSTRACT

An image processing apparatus includes an imaging unit that images a placed medium as a reading target within an imaging area, and a display unit that displays information toward the imaging area in an overlapping manner. Operation supporting information used for supporting an operation using the placed medium is selected based on information relating to a state of the image processing apparatus or information acquired by the imaging unit, and the selected operation supporting information is displayed toward the imaging area by the display unit.

9 Claims, 7 Drawing Sheets

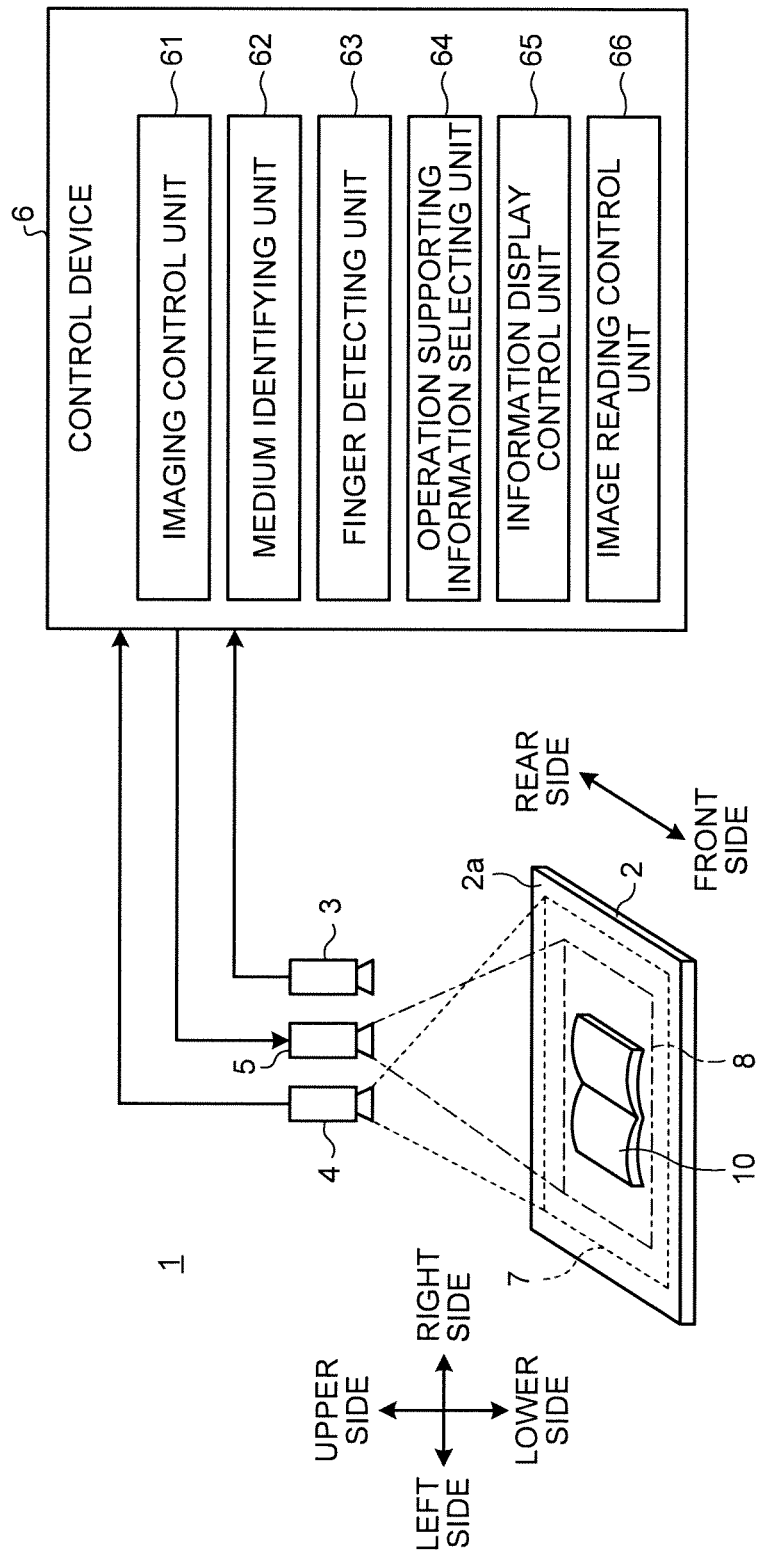

FIG.2

| MEDIUM TYPE | NEWSPAPER | STITCHED MEDIUM (BOOK, MAGAZINE) | CUT SHEET |
|---|---|---|---|
| DETECTION (DETERMINATION) CRITERION | EDGE OF MEDIUM PLACED ON PLACING STAND IS DETECTED, AND MEDIUM TYPE IS DETERMINED BASED ON LINEARITY OF EDGE AND SIZE AND COLOR OF MEDIUM. | | |
| OPERATION MODE | ARTICLE CROP | BOOK SCAN | CUT SHEET SCAN |
| DISPLAY CONTENT OF PROJECTOR | MESSAGE OF "PLEASE DESIGNATE CORNER OF ARTICLE TO BE ACQUIRED" | CONTOUR LINE OF BOOK (CURVE) SWITCH OF "SCAN" SWITCH OF "CONTOUR MODIFICATION" | CONTOUR LINE OF CUT SHEET (STRAIGHT LINE) SWITCH OF "SCAN" SWITCH OF "CONTOUR MODIFICATION" |
| OPERATION ACCORDING TO CLICK USING FINGERTIP | SELECTION OF CORNER COORDINATES | OPERATION CORRESPONDING TO EACH SWITCH | OPERATION CORRESPONDING TO EACH SWITCH |

FIG.3

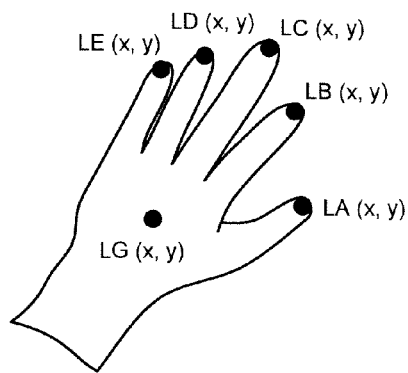

IMAGE PROCESSING APPARATUS, IMAGE READING APPARATUS, IMAGE PROCESSING METHOD, AND IMAGE PROCESSING PROGRAM

CROSS-REFERENCE TO RELATED APPLICATION

This application is based upon and claims the benefit of priority from Japanese Patent Application No. 2012-126273, filed on Jun. 1, 2012, the entire contents of which are incorporated herein by reference.

BACKGROUND OF THE INVENTION

1. Field of the Invention

The present invention relates to an image processing apparatus, an image reading apparatus, an image processing method, and an image processing program.

2. Description of the Related Art

Conventionally, an image processing apparatus such as a scanner apparatus is controlled by a personal computer (PC) or the like connected thereto, and, generally, a main operation is performed on the PC side. Accordingly, a medium that is a reading target is placed inside the scanner apparatus, and an operation is performed with an image of the medium displayed on a separate display device of the PC (for example, Japanese Patent Application Laid-open No. 8-204914).

However, in a conventional image processing apparatus of a type in which a read image is displayed on a separate display device, when an operation or a setting is performed for the image processing apparatus, an operator needs to handle both the image processing apparatus and the display device. For that reason, there is an unnecessary motion of the line of sight or a wasteful operation route of the operator, and accordingly, there is concern that the operation using the image processing apparatus may be ineffective.

SUMMARY OF THE INVENTION

It is an object of the present invention to at least partially solve the problems in the conventional technology.

According to an aspect of the present invention, an image processing apparatus includes an imaging unit that images a placed medium as a reading target within an imaging area, and a display unit that displays information toward the imaging area in an overlapping manner. Operation supporting information used for supporting an operation using the placed medium is selected based on information relating to a state of the image processing apparatus or information acquired by the imaging unit, and the selected operation supporting information is displayed toward the imaging area by the display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram that illustrates the configuration of a scanner apparatus as an example of an image processing apparatus and an image reading apparatus according to an embodiment of the present invention;

FIG. 2 is a diagram that illustrates an example of operations selected in accordance with each type of a medium in a control device illustrated in FIG. 1;

FIG. 3 is a diagram that illustrates an example of positions on fingers of which the positional coordinates are calculated by a finger detecting unit illustrated in FIG. 1;

DETAILED DESCRIPTION OF THE PREFERRED EMBODIMENTS

Figure 4:
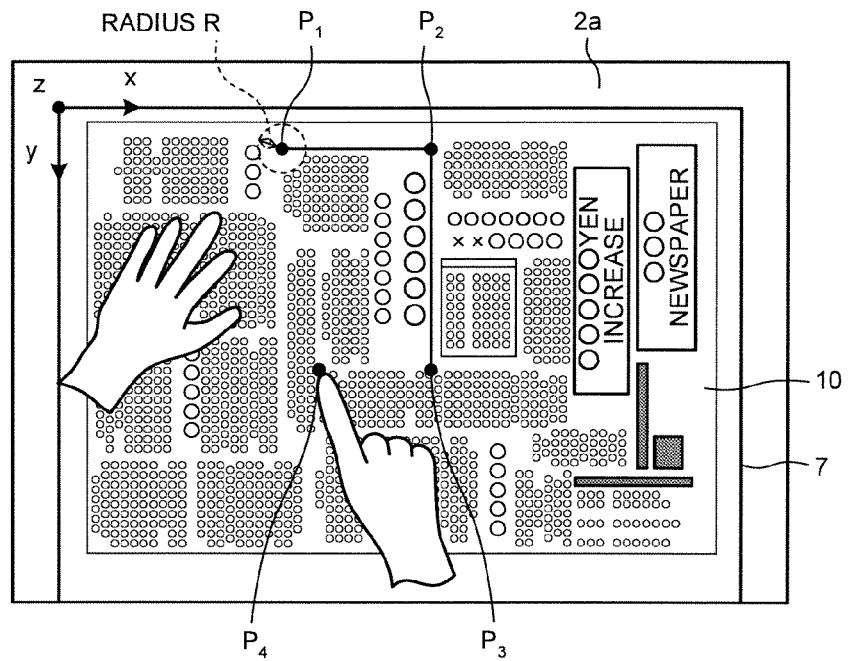
FIG. 4 is a schematic diagram that illustrates an operation of designating corner points in an article crop mode.

Hereinafter, an image processing apparatus, an image reading apparatus, an image processing method, and an image processing program according to embodiments of the present invention will be described with reference to the drawings. In the following drawings, the same reference numeral is assigned to the same parts or parts corresponding to each other, and the description thereof will not be repeated.

In this embodiment, a scanner apparatus will be described as an example of an image reading apparatus. First, the configuration of a scanner apparatus according to this embodiment will be described with reference to FIGS. 1 to 3. FIG. 1 is a schematic diagram that illustrates the configuration of the scanner apparatus as an example of an image processing apparatus and an image reading apparatus according to an embodiment of the present invention, FIG. 2 is a diagram that illustrates an example of operations selected in accordance with each type of a medium in a control device illustrated in FIG. 1, and FIG. 3 is a diagram that illustrates an example of positions on fingers of which the positional coordinates are calculated by a finger detecting unit illustrated in FIG. 1. The upper side, the lower side, the left side, and the right side used in description presented below are with reference to the upper side, the lower side, the left side, and the right side illustrated in FIG. 1. In addition, regarding the front side and the rear side, the front side in FIG. 1 is set as the front side, and the back side is set as the rear side.

As illustrated in FIG. 1, a scanner apparatus 1 is an overhead-type scanner apparatus that can read a medium 10, which is a reading target, placed on a placing face 2a arranged on the upper face of a plate-shaped placing stand 2 using an optical unit 3 (image reading unit) arranged on the upper side.

As the optical unit 3, an existing image reading mechanism that can generate a read image of the medium 10 by imaging the medium 10 placed on the placing face 2a arranged on the lower side can be used. As an example thereof, there is an image reading mechanism that sets an arbitrary position on the placing face 2a in the front/rear direction as a reading target line, includes a line sensor that can read an image of the line, and can generate a read image of the whole medium 10 by moving the position of the reading target line of the line sensor along the front/rear direction of the placing face 2a. The optical unit 3 operates under the control of a control device 6 to be described below and generates a read image of the medium 10.

In addition, in this embodiment, although the upper face of the placing stand 2 included in the scanner apparatus 1 is used as the placing face 2a on which the medium 10 is placed, the placing face 2a is not limited thereto. For example, a configuration may be employed in which the scanner apparatus 1 does not include the placing stand 2, and a flat face such as the upper face of a mount on which the scanner apparatus 1 is installed may be used as the placing face 2a. In addition, although not illustrated in FIG. 1, the scanner apparatus 1 includes an illumination device used for illuminating the placing face 2a.

Particularly in this embodiment, the scanner apparatus 1 can display "operation supporting information" used for supporting an operator of the scanner apparatus 1 to perform an operation using the medium 10 on the medium 10 placed on the placing face 2a or the periphery thereof. Here, the "operation supporting information" according to this embodiment is information used for supporting an operation of scanning the medium 10 and, for example, may include switch images representing various operation instructions relating to the scanning operation, a corner point and a boundary line, which are included in the scanning range, drawn in accordance with an operator's instruction, an emphasized display of the scanning range, or the like. In addition, the operation supporting information may be appropriately selected based on the type of the medium 10 placed on the placing face 2a.

The scanner apparatus 1 can receive input information supplied from an operator in accordance with the position, the shape, and the operation of operator's fingers on the placing face 2a and is configured to support a scanning operation while taking two-way interaction with the operator, for example, by performing the operation of the scanner apparatus 1, update of the displayed operation supporting information, or the like. The scanner apparatus 1 includes a camera (imaging unit) 4, a projector (display unit) 5, and the control device 6.

The camera 4 images the reading target medium 10 placed on the placing face 2a within a predetermined imaging area 7 arranged on the placing face 2a. The camera 4 is installed on the upper side of the placing face 2a so as to enable imaging the imaging area 7 arranged on the placing face 2a. The camera 4 operates under the control of the control device 6 and, in a case where the medium 10 is placed on the placing face 2a, can image the medium 10 disposed within the imaging area 7 and transmit the captured image to the control device 6. The camera 4 can image only the medium 10 in a case where the medium 10 has a size covering the entire area of the imaging area 7 and can image the medium 10 and the imaging area 7 disposed on the periphery thereof in a case where the medium 10 has a size smaller than the imaging area 7. In addition, in a case where the medium 10 is larger than the imaging area 7, or a part of the medium 10 protrudes from the imaging area 7, the camera 4 can image a part of the medium 10 disposed within the imaging area 7 and the imaging area 7 in a case where the imaging area 7 remains on the periphery thereof.

The projector 5 displays information toward the imaging area 7 of the camera 4 in an overlapping manner. The projector 5 displays operation supporting information generated by the control device 6, which will be described below, toward a projection area 8 arranged on the placing face 2a. The projector 5 is arranged on the upper side of the placing face 2a such that at least a part of the projection area 8 overlaps the imaging area 7 of the camera 4. The area of the projection area 8 of the projector 5 may be smaller than that of the imaging area 7 of the camera 4, as illustrated in FIG. 1, or, contrary to the example illustrated in FIG. 1, may be larger than that of the imaging area 7 of the camera 4. The shape of the projection area 8 of the projector 5 may be the same as or different from that of the imaging area 7. In a case where a medium 10 or an operator's finger is present in the imaging area 7, the projector 5 may display the operation supporting information on the medium 10 or the finger in an overlapping manner or display the operation supporting information on the periphery thereof.

The control device 6 controls the operations of the optical unit 3, the camera 4 and the projector 5. In this embodiment, the control device 6 is configured to select operation supporting information used for supporting an operation using the medium 10 based on information relating to the state of the apparatus (scanner apparatus) or information acquired by the camera 4 and display the selected operation supporting information on the imaging area 7 of the placing face 2a using the projector 5.

More specifically, the control device 6, as illustrated in FIG. 1, is configured to realize the functions of an imaging control unit 61 (imaging function), a medium identifying unit 62, a finger detecting unit 63, an operation supporting information selecting unit 64 (selection function), an information display control unit 65 (display function), and an image reading control unit 66 to be described below.

The imaging control unit 61 performs an imaging operation by controlling the operation of the camera 4, thereby acquiring a captured image of the medium 10 placed in the imaging area 7 of the camera 4.

The medium identifying unit 62 analyzes the captured image of the medium 10 acquired by the imaging control unit 61 and identifies the type of the medium 10. The medium identifying unit 62, for example, as illustrated in FIG. 2, detects an edge of the medium 10 from the captured image. Then, the type of the medium 10 can be identified by using information of the size, the color, and the like of the medium 10 determined based on the linearity of the edge and the edge as a determination criterion. The medium identifying unit 62 can identify a plurality of medium types including a newspaper, a stitched medium such as a book and a magazine, and a cut sheet.

In addition, in a case where the medium 10 is detected within the imaging area 7, the medium identifying unit 62 can detect the position coordinates of the medium 10 within the imaging area 7 based on the captured image of the medium 10 acquired by the imaging control unit 61. The position coordinates can be set based on a coordinate space having the x axis and the y axis arranged on the placing face 2a and having the z axis vertically arranged toward the upper side of the placing face 2a (see FIG. 4).

The finger detecting unit 63 detects operator's fingers disposed within the imaging area 7 by analyzing the captured image of the imaging area 7 acquired by the imaging control unit 61. For the recognition of operator's fingers, a known technology in which fingertips are detected by extracting the contour of a hand from a skin-color component of the captured image or the like may be used. The finger detecting unit 63 calculates positional information of fingers when the fingers are detected within the imaging area 7. The positional information of fingers, as illustrated in FIG. 3, includes gravity center coordinates LG(x, y) of the hand, tip coordinates LA(x, y) of the thumb, fingertip coordinates LB(x, y) of the index finger, fingertip coordinates LC(x, y) of the middle finger, fingertip coordinates LD(x, y) of the ring finger, and fingertip coordinates LE(x, y) of the little finger. In addition, in a case where there are two hands of the operator within the imaging area 7, the positional information of fingers of both hands is calculated. The finger detecting unit 63 may be configured to calculate at least some of the gravity center coordinates LG and the fingertip coordinates LA to LE.

In addition, the finger detecting unit 63 can detect a tap operation using an operator's finger on the placing face 2a and a switch pressing operation using an operator's finger when switches representing various operation instructions are displayed on the placing face 2a by the projector 5 to be described below. For the detection of the tap operation or the switch pressing operation in the finger detecting unit 63, for example, the following techniques may be used.

(1) When the position of a fingertip stops for a predetermined time, it is assumed that a tap operation or a switch pressing operation is performed at the position of the coordinates of the fingertip at that time.

(2) When a change of a predetermined value or more in the position of a fingertip in the vertical direction is detected using a distance sensor or the like, it is assumed that a tap operation or a switch pressing operation is performed at the position of the coordinates of the fingertip at that time.

(3) When a touch of a fingertip on the placing face 2a or the approach of a fingertip to the placing face 2a is detected using a proximity sensor (including infrared ray light and an infrared camera) disposed on the placing face 2a, it is assumed that a tap operation or a switch pressing operation is performed at the position of the coordinates of the fingertip at that time.

The operation supporting information selecting unit 64 selects the operation supporting information that can be displayed on the placing face 2a based on information of the type of the medium 10 identified by the medium identifying unit 62 and the position, the operation, and the like of operator's fingers detected by the finger detecting unit 63. Described in more detail, the operation supporting information selecting unit 64 is configured to select an operation mode corresponding to the type of the medium 10. In each operation mode, detailed operation supporting information such as the content of a display on the placing face 2a, which is performed by the projector 5, and the content of an operation performed in accordance with the operator's operation of a finger on the placing face 2a is individually set in advance.

The tie-up between the medium type and the operation mode and a detailed content of the operation mode, for example, are maintained in the storage unit (not illustrated in the figure) arranged inside the control device 6. An example of operation modes selected in correspondence with the type of the medium 10 is illustrated in FIG. 2. FIG. 2 illustrates operation modes of a case where the types of the medium 10 are a "newspaper", a "stitched medium (a book or a magazine), and a "cut sheet" as an example.

In a case where the type of the medium 10 is the "newspaper", the operation supporting information selecting unit 64 can select an operation mode of "article crop" (hereinafter, also referred to as a "article crop mode"). The article crop mode is an operation mode in which only a specific article included in the medium 10 such as a newspaper is cut out, and a scan image of only that portion is generated. In the article crop mode, the projector 5 displays a message such as "Please designate a corner of an article to be acquired!" that urges an operator to perform an operation of designating a scanning range on the placing face 2a. In the article crop mode, when a tap operation using an operator's fingertip is detected, the coordinates of the corner are selected. More specifically, a corner point is drawn and displayed at a position on the placing face 2a at which the tap operation has been detected, and a boundary line is connected from the corner point to another corner point. The article crop mode will be described below in detail with reference to FIGS. 4 to 7.

In a case where the type of the medium 10 is the "stitched medium", the operation supporting information selecting unit 64 can select an operation mode of "book scan" (hereinafter, also referred to as a "book scan mode"). The book scan mode is an operation mode in which an operator can perform a scanning operation while pressing the stitched medium such as a book or a magazine using both hands. In the book scan mode, the projector 5 draws and displays the curved contour line of the stitched medium and draws and displays a "scan" switch and a "contour modification" switch within a peripheral area of the hand on the placing face 2a. In the book scan mode, when a tap operation using an operator's fingertip is detected, in a case where the tap position is within the display range of the switch, an operation corresponding to the switch is performed. In addition, the book scan mode will be described below in detail with reference to FIGS. 8 and 9.

In a case where the type of the medium 10 is the "cut sheet", the operation supporting information selecting unit 64 can select an operation mode of "cut sheet scan" (hereinafter, also referred to as a "cut sheet scan mode"). The cut sheet scan mode is an operation mode in which a cut sheet placed on the placing face 2a is scanned. In the cut sheet scan mode, the projector 5 draws and displays the linear contour line of the cut sheet and draws and displays a "scan" switch and a "contour modification" switch on the placing face 2a (in a case where the hand is present on the placing face 2a, on the periphery thereof). In the cut sheet scan mode, when a tap operation using an operator's fingertip is detected, in a case where the tap position is within the display range of the switch, an operation corresponding to the switch is performed.

The operation supporting information selecting unit 64 sets a display position of the operation supporting information on the placing face 2a, which relates to an operation mode selected in correspondence with the medium type as above, based on the positional information of the medium 10 detected by the medium identifying unit 62 or the positional information of an operator's finger detected by the finger detecting unit 63.

The information display control unit 65 displays the operation supporting information, of which the display position is set, selected by the operation supporting information selecting unit 64 on the placing face 2a by controlling the operation of the projector 5.

In addition, in a case where there is a difference in the position, the area, the resolution, or the like between the imaging area 7 of the camera 4 and the projection area 8 of the projector 5, the information display control unit 65 may perform transformation of both the coordinates. As calibration for the coordinate transformation, for example, a technique may be used in which a transformation table generated based on the coordinate relation of four designated points is used. When the camera coordinates of the four points are denoted by $C_i(x, y)$, and the projector coordinates thereof are denoted by $P_i(x, y)$ (here, i=1 to 4), by calculating a transformation matrix T satisfying the equation of $P_i(x, y)=T*C_i(x, y)$ (here, i=1 to 4), the transformation matrix T can be used as the transformation table.

The image reading control unit 66 generates a read image of the medium 10 by performing an operation of reading the medium 10 by controlling the operation of the optical unit 3. For example, in a case where only a part of the medium 10 is selected as a reading range, as in the above-described article crop mode or the like, the image reading control unit 66 can generate a read image of only the selected portion.

The control device 6 is a computer that includes a central processing unit (CPU), a random access memory (RAM), a read only memory (ROM), and the like in a physical sense. All or some of the above-described functions of the control device 6 are realized by reading/writing data from/into the RAM or the ROM by loading an application program stored in the ROM into the RAM and executing the application program using the CPU.

In addition, the above-described application program may be stored on a computer-readable recording medium or may be configured as a program product. Here, this "recording medium" includes an arbitrary "portable physical medium" such as a memory card, a USB (universal serial bus) memory, an SD (secure digital) card, a flexible disk, a magneto-optical (MO) disk, a ROM, an EPROM, an EEPROM, a CD-ROM, an MO, a DVD (digital versatile disc), or a Blu-ray (trademark) disc. Furthermore, the application program may be stored in an application program server connected to the control device 6 through an arbitrary network, and all or a part of the application program may be downloaded as is necessary.

The control device 6 may be configured to be installed to the inside of the scanner apparatus 1 or may be configured to be connected as an external device of the scanner apparatus 1.

Next, the operation of the scanner apparatus 1 according to this embodiment will be described.

As described with reference to FIG. 2, in this embodiment, an operation mode can be selected in correspondence with the type of the medium 10 as a reading target. Out of the operation modes, the operations of the article crop mode in a case where the medium 10 is a newspaper and the book scan mode of the stitched medium will be described.

Figure 5:
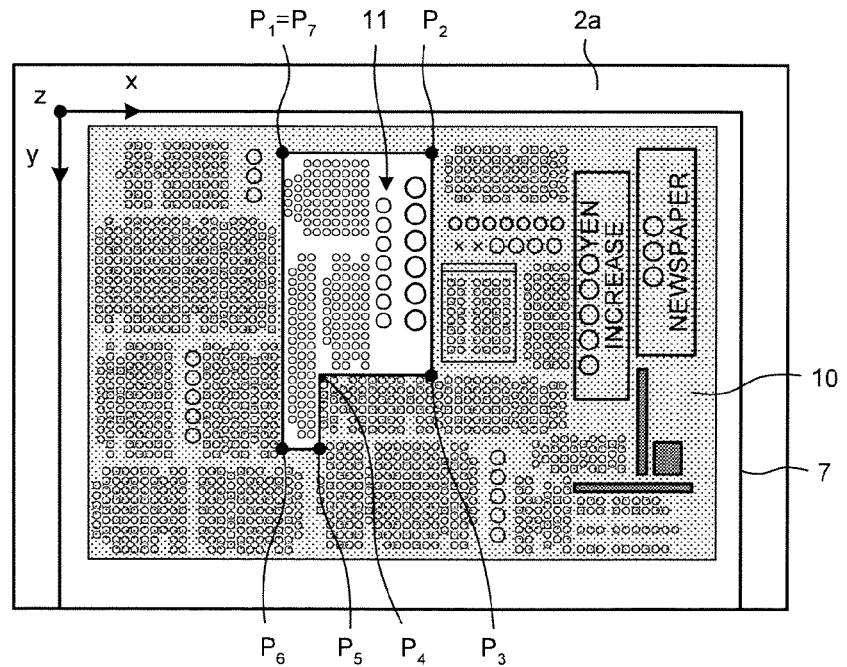
FIG. 5 is a schematic diagram that illustrates a highlight display operation in the article crop mode.
Figure 6:
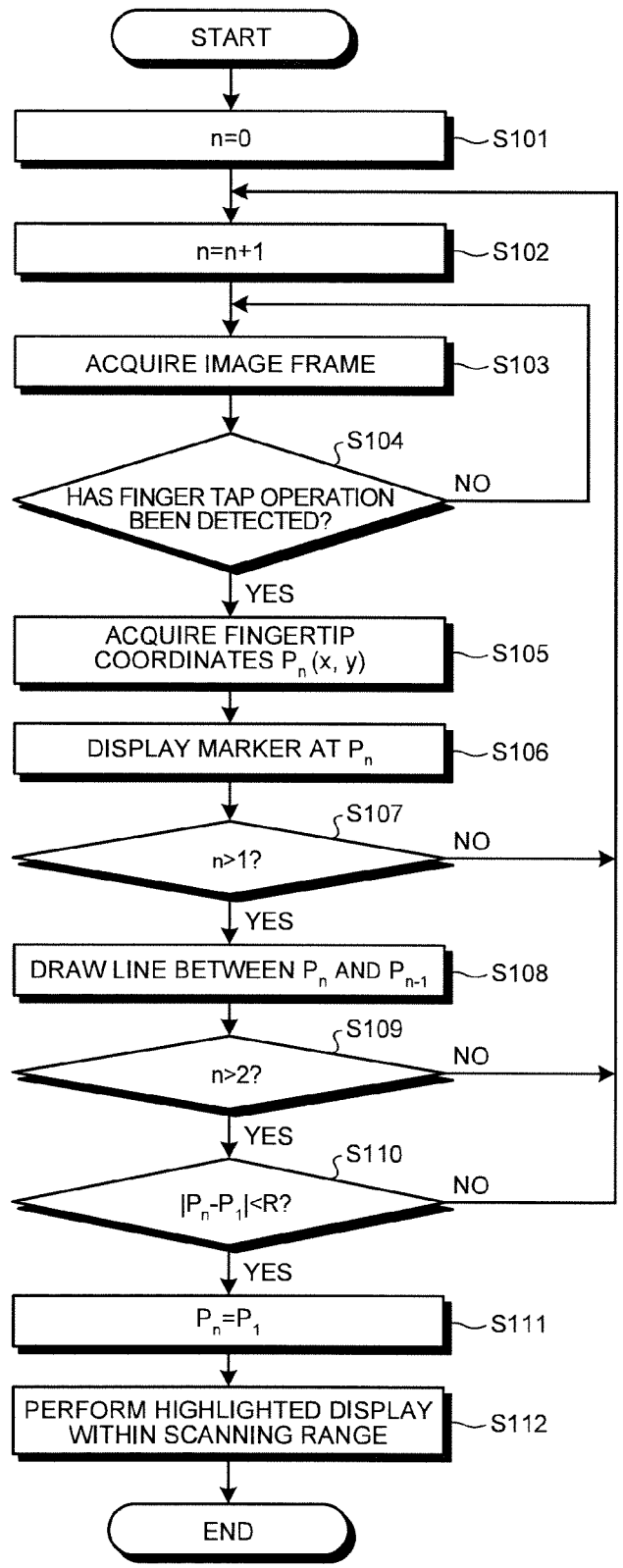
FIG. 6 is a flowchart that illustrates a process of the article crop mode performed by a scanner apparatus according to this embodiment.
Figure 7:
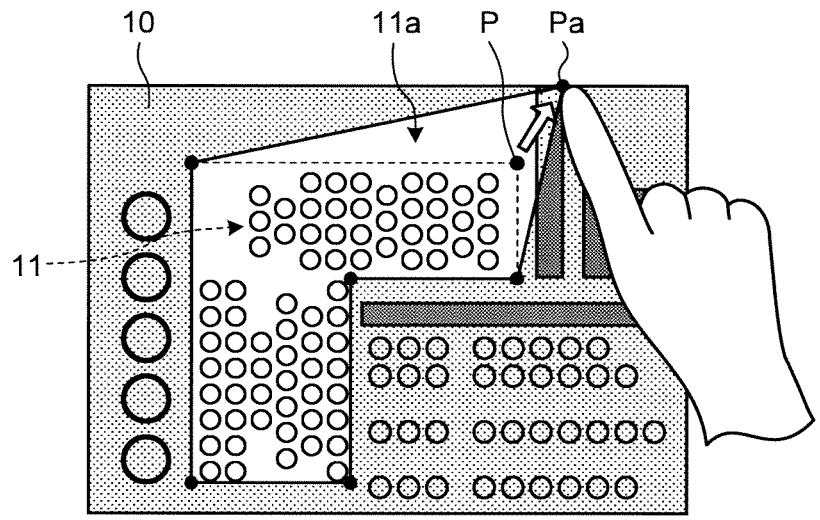
FIG. 7 is a diagram that illustrates an example of a selected range modifying operation in the article crop mode.

First, the article crop mode will be described with reference to FIGS. 4 to 7. FIG. 4 is a schematic diagram that illustrates an operation of designating corner points in the article crop mode, FIG. 5 is a schematic diagram that illustrates a highlight display operation in the article crop mode, FIG. 6 is a flowchart that illustrates the process of the article crop mode performed by the scanner apparatus according to this embodiment, and FIG. 7 is a diagram that illustrates an example of a scanning range modifying operation in the article crop mode.

In the article crop mode, first, as illustrated in FIG. 4, when an operator taps at the corner of an article desired to be read within the area of a newspaper as the medium 10 placed on the placing face 2a, a marker representing a corner point is drawn and displayed toward the tap position. In other words, the position on the medium 10 is designated by an operator's tap operation using a fingertip. When the marker is displayed, a boundary line is drawn from the marker to a marker located at a position that has been previously tapped. In the example illustrated in FIG. 4, tap operations are detected in order of $P_1 \rightarrow P_2 \rightarrow P_3 \rightarrow P4$ at the positions thereof, markers are displayed, and boundary lines are drawn between markers $P_1$ and $P_2$ and markers $P_2$ and $P_3$.

In a case where a tap operation is detected near the marker $P_1$ drawn at the first tap operation (for example, within a predetermined radius of R as illustrated in FIG. 4), all the boundary lines between markers are connected, and the designation of a scanning range 11 is completed. Thereafter, as illustrated in FIG. 5, only the designated scanning range 11 is brightened, and the other area is darkened, whereby a highlighted display in which the designated scanning range 11 (selected area) is emphasized is performed.

The highlighted display is described as an example of an emphasized display in which the designated scanning range 11 is emphasized for the operator. Instead of this, any emphasized display technique other than the highlighted display such as drawing a frame along the contour of the scanning range 11 or changing a background color of the scanning range 11 may be applied.

This operation will be described with reference to the flowchart illustrated in FIG. 6. Before the process of this flowchart is performed, the medium 10 is identified as a newspaper by the medium identifying unit 62.

First, variable n is set to zero in Step S101, and subsequently, an increment process is performed, whereby n is incremented by one in Step S102.

Next, an image frame of the captured image of the placing face 2a is acquired by the imaging control unit 61 by controlling the camera 4 in Step S103 (imaging step), and the image frame is analyzed by the finger detecting unit 63, whereby it is checked whether or not a tap operation using an operator's fingertip has been detected in Step S104. In a case where the tap operation has been detected (Yes in Step S104), the process proceeds to Step S105. On the other hand, in a case where the tap operation has not been detected (No in Step S104), the process is returned to Step S103, and the capturing of a camera image is repeated until a tap operation of a finger is detected.

In a case where a tap operation of a finger has been detected in Step S104, subsequently, fingertip coordinates $P_n(x, y)$ at which the tap operation has been detected by the finger detecting unit 63 are acquired in Step S105, and a marker is drawn and displayed at the fingertip coordinates $P_n$ through the information display control unit 65 and the projector 5 in Step S106 (selection step). In addition, in a case where there is a difference in the area, the shape, or the like between the imaging area 7 of the camera 4 and the projection area 8 of the projector 5, a coordinate transformation process from the camera coordinates to the projector coordinates is performed, and, by drawing a marker at the position coordinates of the projector 5 corresponding to the fingertip coordinates $P_n$, the marker is displayed at the fingertip coordinates $P_n$ on the placing face 2a.

Next, it is checked whether or not variable n is greater than one (n>1) in Step S107. In a case where n is greater than one (Yes in Step S107), a line (straight line) is drawn between markers drawn at the fingertip coordinates $P_n$ of the current tap operation and fingertip coordinates $P_{n-1}$ of the previous tap operation in Step S108. On the other hand, in a case where n is one or less (No in Step S107), the process is returned to Step S102.

Next, it is checked whether or not variable n is greater than 2 (n>2) in Step S109. In a case where n is greater than two (Yes in Step S109), the process proceeds to Step S110. On the other hand, in a case where n is two or less (No in Step S109), the process is returned to Step S102.

In a case where n is greater than two in Step S109, in other words, in a case where three or more markers are drawn and displayed on the medium 10, it is checked whether or not the fingertip coordinates $P_n$ of the marker drawn at this time and the fingertip coordinates $P_1$ of the marker drawn first satisfy a relational expression of "$|P_n-P_1|<R$" in Step S110. Here, R is a predetermined value. In other words, the above-described relational expression represents that the fingertip coordinates $P_n$ of this time is within a circle of radius R having the fingertip coordinates $P_1$ of the first time as its center, and the coordinates $P_n$ are located near the coordinates $P_1$. In a case where the relational expression of "$|P_n-P_1|<R$" is not satisfied, in other words, the coordinates $P_n$ are not located near the coordinates $P_1$ (No in Step S110), the process is returned to Step S102.

On the other hand, in a case where the relational expression of "$|P_n-P_1|<R$" is satisfied, in other words, in a case where the coordinates $P_n$ are located near the coordinates $P_1$ (Yes in Step S110), the designation of corner points of the contour of the article forms one cycle and is returned to the starting point, the designation of the range of the article is assumed to be completed, the fingertip coordinates $P_n$ of the marker of this time is duplicated as the coordinates $P_1$ so as to set $P_n=P_1$ in Step S111, the inside of the designated scanning range 11 is highlighted in Step S112 (display step), and the process ends.

The schematic diagram of FIG. 4 illustrates a state in which "No" is determined in Step S110 illustrated in FIG. 6, and the latest corner point $P_n$ has not arrived at the starting point $P_1$. The schematic diagram of FIG. 5 illustrates a state in which "Yes" is determined in Step S110 illustrated in FIG. 6, the designation of the range of the article is completed, and the scanning range 11 is displayed with being highlighted.

In addition, in the article crop mode, as illustrated in FIG. 7, in a case where the scanning range 11 is inappropriate, the scanning range can be modified by moving the marker located at the corner position. For example, after the designation of the scanning range 11 is completed, in a case where a tap operation of a fingertip is detected on the marker P, the marker P is selected, and then the position of the marker P is moved to a position tapped by the fingertip, whereby a marker Pa is newly displayed. Then, by redrawing boundary lines on which the position of the new marker Pa is reflected, the scanning range 11 is modified, whereby a new scanning range 11a can be displayed.

In a case where a newspaper is to be scanned, there are many cases where not data of the whole face of the newspaper is desired to be acquired, but only information of a specific article is desired to be scanned, for example, for scrapping newspaper articles. In a conventional scanner apparatus, generally, after the whole face of the newspaper is scanned, only a necessary part is cut out and stored using application software. Accordingly, a large amount of data of the whole newspaper needs to be read at once, and, after reading the whole data, an operation of cutting out a necessary portion is performed, which is not desirable in terms of the data capacity or the operation efficiency.

In the scanner apparatus 1 according to this embodiment, in order to scan a newspaper, by performing the above-described article crop mode, an article of the newspaper, which is needed, can be selected before a main scan. Accordingly, since a read image can be generated by extracting only an article that is needed, the amount of data generated by the scanning operation can be reduced. In addition, since the scanning range 11 is designated by an operator tapping (pressing operation) the corner of the needed article on the newspaper of the medium 10, and the designated scanning range 11 is displayed on the newspaper of the medium 10 by the projector 5 in a directly overlapping manner, the operator can easily determine a result of his operation on whether the designated range is appropriate instantly and can directly modify the scanning range 11 on the placing face 2a even in a case where the designated scanning range 11 is inappropriate, whereby an effective scanning operation can be performed.

Figure 8:
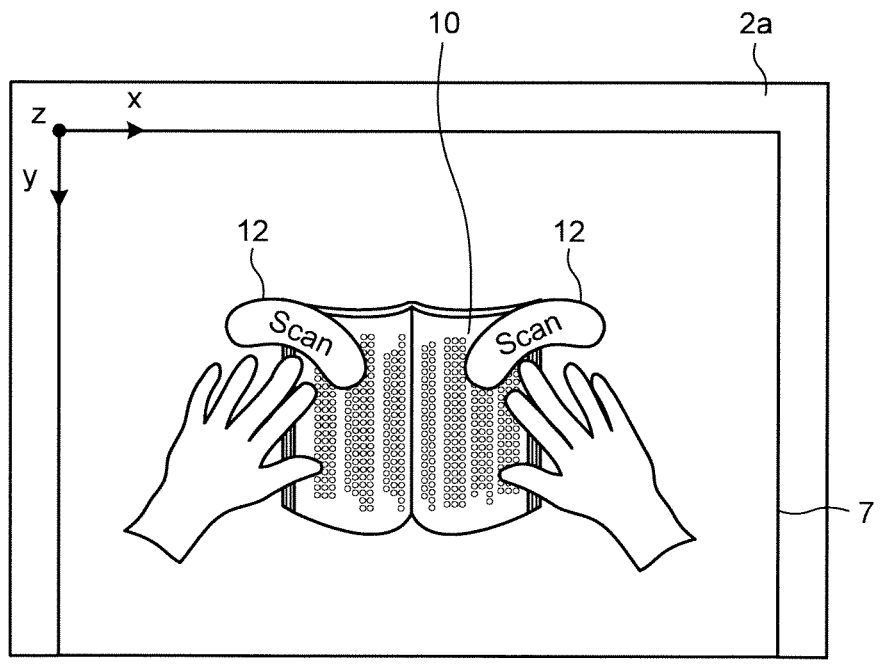
FIG. 8 is a schematic diagram that illustrates a switch displaying operation in a book scan mode.
Figure 9:
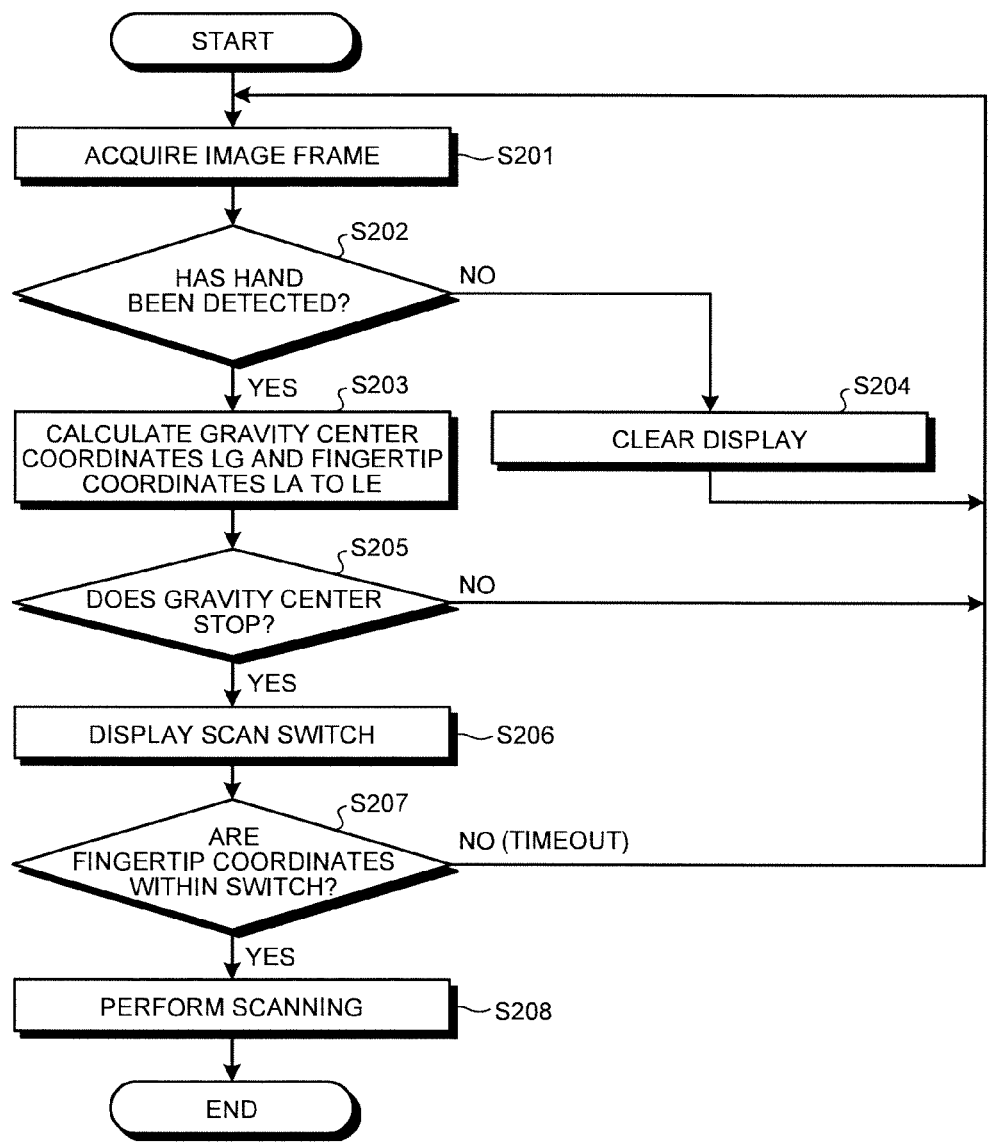
FIG. 9 is a flowchart that illustrates the process of the book scan mode performed by the scanner apparatus according to this embodiment.

Next, the book scan mode will be described with reference to FIGS. 8 and 9. FIG. 8 is a schematic diagram that illustrates a switch displaying operation in the book scan mode, and FIG. 9 is a flowchart that illustrates the process of the book scan mode performed by the scanner apparatus according to this embodiment.

In the book scan mode, as illustrated in FIG. 8, in a state in which the operator presses both ends of the stitched medium 10 using both hands, and both the hands are constrained, the contour line of the stitched medium 10 is drawn and displayed, a scan switch 12 (operation input unit) is further drawn and displayed toward the inside of the peripheral area of fingers (on the fingers or on the periphery thereof). Then, in a case where an operation of pressing the scan switch 12 using a finger of the operator is detected, a scanning operation is performed. Although not illustrated in FIG. 8, for example, a switch used for an instruction for performing an operation other than the scanning operation such as a "contour modifying" operation for modifying the contour line of the stitched medium 10 may be displayed together.

This operation will be described with reference to a flowchart illustrated in FIG. 9. Before the process of this flowchart is performed, the medium 10 is identified to be a stitched medium by the medium identifying unit 62.

First, by the imaging control unit 61, an image frame of the captured image of the placing face 2a is acquired by controlling the camera 4 in Step S201 (imaging step), and the image frame is analyzed by the finger detecting unit 63, and it is checked whether the operator's both hands are detected within the imaging area 7 in Step S202. In a case where the operator's both hands are detected (Yes in Step S202), the process proceeds to Step S203. On the other hand, in a case where the operator's both hands are not detected (No in Step S202), the displayed content of the projector 5 is cleared at once in Step S204, and the process is returned to Step S201.

On the other hand, in a case where the operator's both hands are detected in Step S202, consecutively, the gravity center coordinates LG of the hands and the fingertip coordinates LA to LE of the fingers are calculated by the finger detecting unit 63 in Step S203 (selection step). The positions of the gravity center coordinates LG and the fingertip coordinates LA to LE are as illustrated in FIG. 3.

Next, it is checked whether the gravity center of the operator's both hands temporarily stops on the imaging area 7 in Step S205. Whether the gravity center stops or not, for example, may be determined based on whether or not the amount of change in the gravity center coordinates LG within a predetermined time is a predetermined value or less. In a case where the gravity center stops (Yes in Step S205), the process proceeds to Step S206. On the other hand, in a case where the gravity center does not stop (No in Step S205), the process is returned to Step S201.

In Step S205, in a case where the gravity center of the operator's both hands stops, a state is assumed in which the operator presses the stitched medium using both hands, and the scan switch 12 is drawn and displayed toward the periphery of the operator's both hands through the information display control unit 65 and the projector 5 in Step S206 (display step). The drawing position of the scan switch 12, for example, as illustrated in FIG. 8, may be set as a position separated from the fingertips of both the hands to the outer side by a predetermined distance.

Then, it is checked whether or not one of the fingertip coordinates LA to LE has moved into the inside of the drawing range of the displayed scan switch 12 in Step S207. In a case where one of the fingertip coordinates LA to LE has not been moved to the upper side of the scan switch 12 within a predetermined time after the display of the scan switch 12 (No in Step S207), the process is returned to Step S201. On the other hand, in a case where one of the fingertip coordinates LA to LE has moved to the upper side of the scan switch 12 within a predetermined time after the display of the scan switch 12 (Yes in Step S207), the scanning operation is performed by the image reading control unit 66 in Step S208, and the process ends.

In the case of a scanner apparatus having an automatic document feeder (ADF) mounted thereon, the scanning target is mainly a cut sheet. However, in the case of an overhead-type scanner, scanning can be performed not only for a cut sheet but also for a stitched medium such as a book, a large medium such as a newspaper, and a medium having a wrinkle or a folded portion. When such a medium is set on a document stand or a table and is directly scanned, an image is distorted due to a large curve of the book or a folded portion or a wrinkle of a medium, and accordingly a desired image cannot be acquired. Thus, it is considered to press the medium using the operator's both hands for stretching the curve, the bending, or the wrinkle of the medium. However, in such a case, since both hands press the medium and are constrained, a switch for performing a scanning operation cannot be pressed.

In the scanner apparatus 1 according to this embodiment, in order to scan a stitched medium, by performing the above-described book scan mode, the scan switch 12 is displayed near the operator's both hands pressing the stitched medium. From this, the operator can press the scan switch 12 while pressing the medium, and accordingly, the scanning operation can be performed while improving the distortion or the wrinkle for a medium such as a stitched medium having a distortion or a wrinkle.

Figure 10:
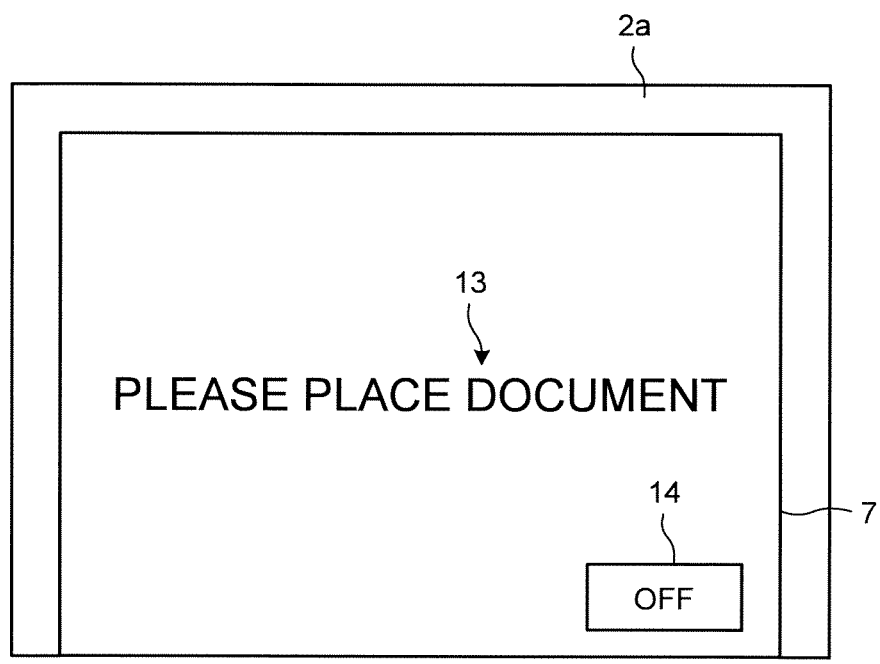
FIG. 10 is a schematic diagram that illustrates an example of operation supporting information when a medium is not placed on a placing face.

In addition, the scanner apparatus 1 can display information relating to operator's operation supporting on the placing face 2a through the projector 5 based on information relating to the state of the scanner apparatus even in a state in which a medium 10 is not placed on the placing face 2a. FIG. 10 is a schematic diagram illustrating an example of the operation supporting information when a medium is not placed on the placing face. In the example illustrated in FIG. 10, the control device 6 of the scanner apparatus 1 displays the operation supporting information based on information relating to the state of the scanner apparatus that is a state right after power-on of the scanner apparatus 1. More specifically, as illustrated in FIG. 10, in the state right after the power-on of the scanner apparatus 1, a message 13 of "Please place document" is displayed on the placing face 2a, a scannable range (the same range as the imaging area 7 of the camera 4 in the example illustrated in FIG. 10) is displayed with being highlighted, and a power-off switch 14 of the device is also displayed.

Next, advantages of the scanner apparatus 1 according to this embodiment will be described.

The scanner apparatus 1 according to this embodiment includes the camera 4 that images the placed medium 10 as a reading target within the imaging area 7 and the projector 5 that displays information toward the imaging area 7 in an overlapping manner. The control device 6 of the scanner apparatus 1 selects operation supporting information used for supporting a scanning operation using the medium 10 based on the information relating to the state of the scanner apparatus 1 or the information acquired by the camera 4 and displays the selected operation supporting information toward the imaging area 7 by using the projector 5.

By employing such a configuration, since the operation supporting information used for supporting a scanning operation is displayed toward the imaging area 7 including the medium 10 through the projector 5, the operator of the scanner apparatus 1 can perform the operation only on the medium 10 within the imaging area 7 on the placing face 2a or a peripheral area thereof. From this, the operation route or the line of sight of the operator is not unnecessarily changed, and therefore, an effective operation can be performed. In addition, since the operator can perform the operation while referring to the operation supporting information, the operation sequence or the operation result thereof can be instantly checked, whereby an effective operation can be performed.

In addition, the scanner apparatus 1 according to this embodiment has a plurality of types of media 10 as reading targets. For example, in a case where the medium 10 is a newspaper or a stitched medium, there is a case where information or operations necessary for each specific operation level are different while the operation is called as a scanning operation as well. In the scanner apparatus 1 according to this embodiment, the operation supporting information selecting unit 64 can select operation supporting information in accordance with the type of the medium 10. More specifically, in a case where the medium 10 is a newspaper, operation supporting information relating to the article crop mode can be selected, and, in a case where medium 10 is a stitched medium, operation supporting information relating to the book scan mode can be selected. From this, information corresponding to a scanning operation for a plurality of types of media 10 can be appropriately provided to the operator, whereby a further more effective operation can be performed.

In the scanner apparatus 1 according to this embodiment, information acquired by the camera 4 includes the information relating to the positions of the operator's fingers. From this, information corresponding to the situation of the operator can be appropriately provided, and a further more effective operation can be performed.

In addition, the scanner apparatus 1 according to this embodiment includes the optical unit 3 that reads at least a part of the medium 10 based on the operation supporting information. The optical unit 3 is a separate unit that separates from the camera 4 imaging the medium 10 in order to provide the operation supporting information. Accordingly, even in the middle of the scanning operation performed by the optical unit 3, the behavior of the medium 10, the operator's fingers, and the like can be monitored using the camera 4, and, the information can be displayed on the placing face 2a as is necessary, whereby the efficiency of the scanning operation can be improved.

As above, while the embodiment of the present invention has been described, the embodiment is presented as an example but is not for the purpose of limiting the scope of the invention. The above-described embodiment can be performed in other various forms, and various omissions, replacements, or changes can be made therein in a range not departing from the concept of the invention. The above-described embodiment and a modification thereof, similarly to being included in the scope or the concept of the invention, are included in the scope of the invention written in the claims and an equivalent scope thereof.

In the above-described embodiment, while the scanner apparatus 1 has been described as an example of the image reading apparatus reading the medium 10, the present invention can also be applied to the other image reading apparatuses such as a copier, a facsimile, and a character recognition apparatus.

Similarly, the apparatus according to an embodiment of the present invention may be an apparatus capable of displaying the operation supporting information on the medium 10 placed on the placing face 2a or on the periphery thereof, and the present invention can be applied to an image processing apparatus that includes only the camera 4 and the projector 5 but does not have an image reading function corresponding to the optical unit 3. For example, the image processing apparatus may include a write supporting apparatus that displays information representing a write position and a write content on the medium 10 in an overlapping manner when the medium 10 such as an application sheet that is a medium 10 requiring a user to write some information thereon is placed on the placing face 2a.

In addition, in the above-described embodiment, since the scanner apparatus 1 has been described as an example of the image reading apparatus, information used for supporting the scanning operation using the medium 10 has been described as an example of the operation supporting information displayed on the placing face 2a. On the other hand, in a case where the present invention is applied to an image reading apparatus other than the scanner apparatus 1 or an image processing apparatus, information used for supporting a target operation of the apparatus may be appropriately set as the content of the operation supporting information.

In the above-described embodiment, although the finger detecting unit 63 of the control device 6 has an exemplary configuration in which the positional information of operator's fingers disposed within the imaging area 7 is calculated based on the captured image, the finger detecting unit 63 may have a configuration in which information other than the positional information such as the shape or the operation of a finger or a gesture is detected.

In the above-described embodiment, although the configuration has been described as an example in which the camera 4 used for acquiring an image for supporting the operation and the optical unit 3 used for reading an image are included as separate units, a single imaging device that can realize the functions of both the camera 4 and the optical unit 3 may be used instead of them.

In addition, in the above-described embodiment, while the medium identifying unit 62 of the control device 6 is configured to analyze the captured image of the medium 10 acquired by the imaging control unit 61 and automatically identify the type of the medium 10, the medium identifying unit 62 may be configured to manually identify the type of the medium 10 based on a selection instruction supplied from the operator. For example, the type of the medium 10 may be identified by displaying selection buttons corresponding to the types of the medium 10 on the placing face 2a and detecting a selection button pressed by the operator.

In the above-described embodiment, while the configuration has been described as an example in which an operation mode set for each type of medium 10 is selected such that the article clip mode (or crop mode) is selected when the medium 10 is a newspaper, and the book scan mode is selected when the medium 10 is a stitched medium, the content of the operation mode may be appropriately changed. For example, in the case where the medium 10 is a newspaper, similarly to the case of the book scan mode, an operation switch may be configured to be displayed near the hands, and, in the case where the medium 10 is a stitched medium, similarly to the case of the article clip mode, the scanning range may be configured to be selected.

In addition, in the above-described embodiment, while the configuration has been described as an example in which the scanner apparatus 1 individually selects and displays the operation supporting information in correspondence with a plurality of types of medium 10, the scanner apparatus 1 may set only a specific type of medium 10 as a reading target.

In an image processing apparatus, an image reading apparatus, an image processing method, and an image processing program according to the present invention, operation supporting information is displayed on a medium arranged within an imaging area or the periphery thereof through a display unit, and it is possible for an operator to perform an operation only on the medium or in a peripheral area thereof. Accordingly, the operation route or the line of sight of the operator is not unnecessarily changed, and therefore, there is an advantage that an effective operation can be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a first image reader configured to read an imaging area in which a medium is placed, for forming an image of the imaging area;
a projector configured to project information on a projection area that overlaps the imaging area;
a second image reader configured to read the medium for forming an image of the medium; and
a controller configured to:
select one of operation supporting items based on the image of the imaging area, the operation supporting items being stored in advance for supporting an operator to image the medium with the second image reader;
control the projector to project the information on the projection area based on the selected operation supporting item;
control the second image reader to read the medium based on the selected operation supporting item for forming the image of the medium;
detect a position of an operator's finger or hand based on the image of the imaging area,
control the projector to project an operation input sign around the operator's finger or hand, the operation input sign being associated with a predefined operation of the image reading apparatus;
determine whether the operator selects the operation input sign based on the image of the imaging area; and
perform the predefined operation associated with the operation input sign when the operator selects the operation input sign.

2. The image reading apparatus according to claim 1, wherein the operation supporting items are associated with types of mediums to be read, respectively.

3. The image reading apparatus according to claim 1, wherein the controller is configured to obtain from the image of the imaging area, information on a movement, a position, or a shape of the operator's finger.

4. The image reading apparatus according to claim 1, wherein the controller is configured to detect a selection of an area on the medium by the operator's fingertip, based on the image of the imaging area, and control the projector to indicate the area on the medium.

5. The image reading apparatus according to claim 4, wherein the controller is configured to control the second image reader to read the area selected by the operator.

6. The image reading apparatus according to claim 1, wherein
the first image reader is a camera configured to record the image of the imaging area, and
the second image reader is a scanner configured to scan the medium.

7. The image reading apparatus according to claim 1, wherein the projection area is arranged within the imaging area.

8. An image processing method for an image reading apparatus which comprises a first image reader configured to read an imaging area in which a medium is placed, for forming an image of the imaging area, a projector configured to project information on a projection area that overlaps the imaging area, and a second image reader configured to read the medium for forming an image of the medium, the image processing method comprising:

selecting one of operation supporting items based on the image of the imaging area, the operation supporting items being stored in advance for supporting an operator to read the medium with the second image reader;

controlling the projector to project the information on the projection area based on the selected operation supporting item;

controlling the second image reader to read the medium based on the selected operation supporting item for forming the image of the medium;

detecting a position of an operator's finger or hand based on the image of the imaging area;

controlling the projector to project an operation input sign around the operator's finger or hand, the operation input sign being associated with a predefined operation of the image reading apparatus;

determining whether the operator selects the operation input sign based on the image of the imaging area; and performing the predefined operation associated with the operation input sign when the operator selects the operation input sign.

9. A non-transitory tangible computer readable storage medium storing therein a program for an image processing method of operating an image reading apparatus which comprises a first image reader configured to read an imaging area in which a medium is placed, for forming an image of the imaging area, a projector configured to project information on a projection area that overlaps the imaging area, and a second image reader configured to read the medium for forming an image of the medium, the image processing method comprising:

selecting one of operation supporting items based on the image of the imaging area, the operation supporting items being stored in advance for supporting an operator to read the medium with the second image reader;

controlling the projector to project the information on the projection area based on the selected operation supporting item;

controlling the second image reader to read the medium based on the selected operation supporting item for forming the image of the medium;

detecting a position of an operator's finger or hand based on the image of the imaging area;

controlling the projector to project an operation input sign around the operator's finger or hand, the operation input sign being associated with a predefined operation of the image reading apparatus;

determining whether the operator selects the operation input sign based on the image of the imaging area; and performing the predefined operation associated with the operation input sign when the operator selects the operation input sign.

* * * * *